United States Patent
Shachar et al.

(10) Patent No.: US 12,143,894 B2
(45) Date of Patent: Nov. 12, 2024

(54) MONITORING TOOL FOR DETECTING VIOLATIONS OF USER PHYSICAL LOCATION CONSTRAINTS

(71) Applicant: EMC IP Holding Company LLC, Hopkinton, MA (US)

(72) Inventors: Tomer Shachar, Omer (IL); Yevgeni Gehtman, Modi'in (IL); Maxim Balin, Gan Yavne (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 142 days.

(21) Appl. No.: 17/460,572

(22) Filed: Aug. 30, 2021

(65) Prior Publication Data

US 2023/0065791 A1 Mar. 2, 2023

(51) Int. Cl.
   *H04W 4/029* (2018.01)
   *H04W 4/33* (2018.01)

(52) U.S. Cl.
   CPC .............. *H04W 4/029* (2018.02); *H04W 4/33* (2018.02)

(58) Field of Classification Search
   CPC ................................ H04W 4/33; H04W 4/029
   See application file for complete search history.

(56) References Cited

U.S. PATENT DOCUMENTS

| 10,911,552 B1* | 2/2021 | Montevirgen | .......... H04W 4/80 |
| 11,024,116 B1 | 6/2021 | Hoehne | |
| 2001/0029534 A1* | 10/2001 | Spinks | ..................... H04L 41/06 |
| | | | 709/224 |
| 2014/0105061 A1* | 4/2014 | Kannan | .................. H04W 48/20 |
| | | | 370/254 |
| 2015/0319730 A1* | 11/2015 | Seine | ................... H04W 64/003 |
| | | | 370/338 |
| 2018/0063165 A1* | 3/2018 | Mankovskii | .......... H04W 12/08 |
| 2019/0260577 A1* | 8/2019 | Ren | ........................ H04L 9/0816 |
| 2021/0144150 A1* | 5/2021 | James | ................... H04W 12/08 |
| 2022/0407893 A1* | 12/2022 | Maiman | .................. H04L 63/08 |

OTHER PUBLICATIONS https://arxiv.org/pdf/2004.09246.pdf, downloaded Aug. 25, 2021.
https://www.thomasnet.com/insights/lidar-expert-explains-how-the-technology-can-enforce-social-distancing-without-need-for-staff-intervention-interview/, downloaded Aug. 25, 2021.

* cited by examiner

*Primary Examiner* — Dai Phuong
(74) *Attorney, Agent, or Firm* — Ryan, Mason & Lewis, LLP

(57) ABSTRACT

Techniques are provided for detecting violations of user physical location constraints. One method comprises obtaining a constraint on a physical location of a user within a building; evaluating a network signal from a processing device of the user to identify a physical port that connects the processing device of the user to a network; obtaining a mapping of the physical port to a physical location within the building to determine the physical location of the user within the building; determining if the physical location of the user within the building violates the constraint; and initiating an automated remedial action in response to a result of the determining. The user can be identified using a device signature of the processing device of the user (e.g., based on one or more identifiers of hardware, software and/or network elements associated with the processing device).

20 Claims, 8 Drawing Sheets

| PORT MAPPING TABLE | |
|---|---|
| PHYSICAL PORT IDENTIFIER | WORKSTATION IDENTIFIER |
| 220-1 | 210-1 |
| 220-2 | 210-2 |
| 220-3 | 210-3 |
| 220-4 | 210-4 |
| ... | ... |
| 220-N | 210-N |

| WORKSTATION ASSIGNMENT TABLE | | |
|---|---|---|
| WORKSTATION IDENTIFIER | ROOM IDENTIFIER | USER IDENTIFIER |
| 210-1 | 230-1 | EMPLOYEE A |
| 210-2 | 230-1 | EMPTY |
| 210-3 | 230-2 | EMPLOYEE B |
| 210-4 | 230-2 | EMPTY |
| ... | ... | ... |
| 210-N | 230-2 | EMPTY |

MONITORING TOOL FOR DETECTING VIOLATIONS OF USER PHYSICAL LOCATION CONSTRAINTS

FIELD

The field relates generally to information processing systems, and more particularly to using such information processing systems to monitor user locations.

BACKGROUND

There are a number of situations where a person should be limited to, or excluded from, certain locations. For example, for public health reasons, social distancing practices encourage people to maintain certain physical distances from other people. In addition, in an office environment, an organization may require that only employees of a given department work in a given area (e.g., to reduce information leakage).

A need remains for improved techniques for enforcing constraints on a physical location of users.

SUMMARY

In one embodiment, a method comprises obtaining at least one processor-readable constraint on a physical location of at least one user within a building; evaluating one or more network signals from a processing device of the at least one user to identify a physical port that connects the processing device of the at least one user to a network at least partially within the building; obtaining a mapping of the physical port to a physical location within the building to determine the physical location of the at least one user within the building; determining if the physical location of the at least one user within the building violates the at least one processor-readable constraint; and initiating one or more automated remedial actions in response to a result of the determining.

In some embodiments, the at least one user is identified using a device signature of the processing device of the at least one user. For example, the device signature can be generated using one or more identifiers of at least one hardware element, at least one software element and/or at least one network element associated with the processing device of the at least one user. In one or more embodiments, the at least one processor-readable constraint on the physical location of the at least one user comprises a constraint to maintain a specified separation of the at least one user from at least one other user.

Other illustrative embodiments include, without limitation, apparatus, systems, methods and computer program products comprising processor-readable storage media.

BRIEF DESCRIPTION OF THE DRAWINGS

FIG. 3 illustrates an exemplary workstation assignment table, according to some embodiments;

FIG. 4 illustrates an exemplary port mapping table, according to at least one embodiment;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for detecting violations of user physical location constraints.

As noted above, there are a number of situations where a person should be limited to, or excluded from, certain locations. While one or more embodiments of the present disclosure are illustrated in the context of social distancing requirements in an office setting, the disclosed techniques for detecting violations of user physical location constraints can be employed to enforce other physical location constraints in other environments, as would be apparent to a person of ordinary skill in the art. For example, an organization may require that only employees of a given department (or with a same security clearance level) work in a given area (e.g., to reduce information leakage). In addition, an organization may adopt other policies that specify constraints on the physical location of users.

Some embodiments of the disclosed physical location monitoring techniques provide a mechanism for automatic detection of potential violations of specified user physical location constraints. When a user attempts to work in a particular location of an office, for example, the identity of the user and the selected physical location can be automatically determined. In this manner, the disclosed techniques enable enforcement of policies based at least in part on a physical location of a user in a given environment, such as an office. An alert can be generated if the location selected by the user violates one or more predefined policies or physical location constraints.

Figure 1:
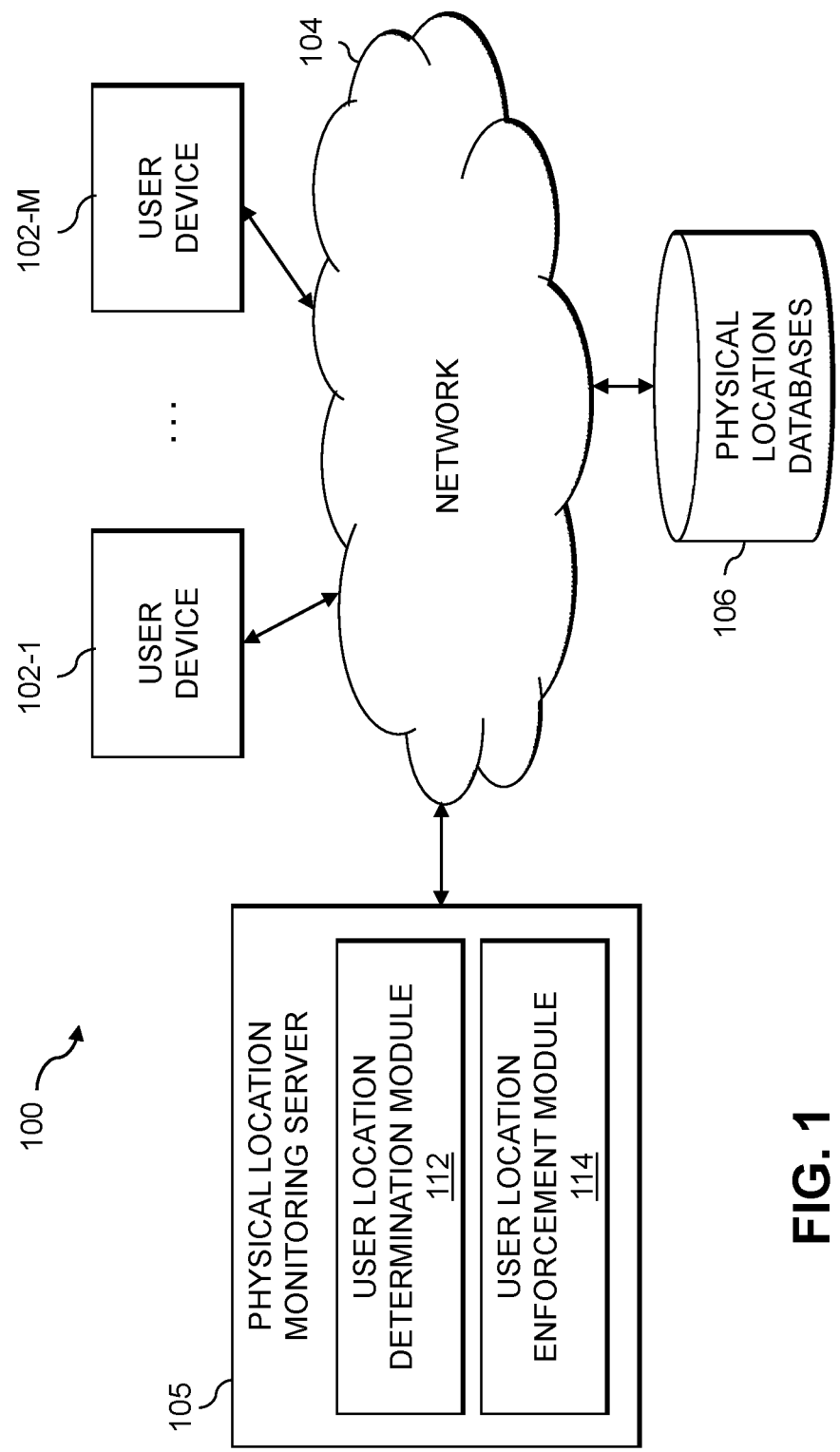
FIG. 1 illustrates an information processing system configured to detect violations of user physical location constraints in accordance with an illustrative embodiment.

FIG. 1 shows a computer network (also referred to herein as an information processing system) 100 configured in accordance with an illustrative embodiment. The computer network 100 comprises a plurality of user devices 102-1 through 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is one or more physical location monitoring servers 105 and physical location databases 106, discussed below.

The user devices 102 may comprise, for example, host devices and/or devices such as mobile telephones, laptop computers, tablet computers, desktop computers or other types of computing devices. Such devices are examples of what are more generally referred to herein as "processing devices." Some of these processing devices are also generally referred to herein as "computers." The user devices 102 may comprise a network client that includes networking capabilities such as ethernet, Wi-Fi, etc. When the user devices 102 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices.

The user devices 102 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

It is to be appreciated that the term "user" in this context and elsewhere herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The physical location monitoring server 105 may be implemented, for example, on the cloud or on the premises of an enterprise or another entity. In some embodiments, the physical location monitoring server 105, or portions thereof, may be implemented as part of a storage system or on a host device. As also depicted in FIG. 1, the physical location monitoring server 105 further comprises a user location determination module 112 and a user location enforcement module 114. In some embodiments, the user location determination module 112 automatically determines a location of a user in a given space, for example, when the user attempts to work in a particular location of an office. The user location enforcement module 114 evaluates the determined location of the user in the given space relative to one or more physical location constraints to identify potential violations of the physical location constraints.

It is to be appreciated that this particular arrangement of modules 112 and 114 illustrated in the physical location monitoring server 105 of the FIG. 1 embodiment is presented by way of example only, and alternative arrangements can be used in other embodiments. For example, the functionality associated with modules 112 and 114 in other embodiments can be combined into a single module, or separated across a larger number of modules. As another example, multiple distinct processors can be used to implement different ones of modules 112 and 114 or portions thereof.

At least portions of modules 112 and 114 may be implemented at least in part in the form of software that is stored in memory and executed by a processor. An exemplary process utilizing modules 112 and 114 of an example physical location monitoring server 105 in computer network 100 will be described in more detail with reference to the flow diagrams of, for example, FIGS. 6 and 7.

Additionally, the physical location monitoring server 105 can have an associated physical location database 106 configured to store, for example, assignments of users to work in particular locations (e.g., rooms or at specific workstations), for example, according to a schedule; a mapping of network ports to particular workstations and/or one or more physical location constraint policies, as discussed further below in conjunction with FIGS. 3 through 5. In addition, the physical location database 106 may also store human resource records, user credentials, user authorizations and/or identifiers of the authorized users in particular environments (e.g., of each team member, department member, division member or enterprise member).

The physical location database 106 in the present embodiment is implemented using one or more storage systems associated with the physical location monitoring server 105. Such storage systems can comprise any of a variety of different types of storage such as, network-attached storage (NAS), storage area networks (SANs), direct-attached storage (DAS) and distributed DAS, as well as combinations of these and other storage types, including software-defined storage.

The user devices 102 and the physical location monitoring server 105 may be implemented on a common processing platform, or on separate processing platforms. The user devices 102 are configured to interact over the network 104 with the physical location monitoring server 105.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 102 and the storage system to reside in different data centers. Numerous other distributed implementations of the host devices and the storage system are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the user devices 102 and/or the physical location monitoring server 105 can be one or more input-output devices (not shown), which illustratively comprise keyboards, displays or other types of input-output devices in any combination. Such input-output devices can be used, for example, to support one or more user interfaces to the physical location monitoring server 105, as well as to support communication between the physical location monitoring server 105 and other related systems and devices not explicitly shown.

The user devices 102 and the physical location monitoring server 105 in the FIG. 1 embodiment are assumed to be implemented using at least one processing device. Each such processing device generally comprises at least one processor and an associated memory, and implements one or more functional modules for controlling certain features of the physical location monitoring server 105.

More particularly, user devices 102 and physical location monitoring server 105 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the user devices 102 and/or the physical location monitoring server 105 to communicate over the network 104 with each other (as well as one or more other networked devices), and illustratively comprises one or more conventional transceivers.

It is to be understood that the particular set of elements shown in FIG. 1 for detecting violations of user physical location constraints is presented by way of illustrative example only, and in other embodiments additional or alternative elements may be used. Thus, another embodiment includes additional or alternative systems, devices and other network entities, as well as different arrangements of modules and other components.

Figure 2:
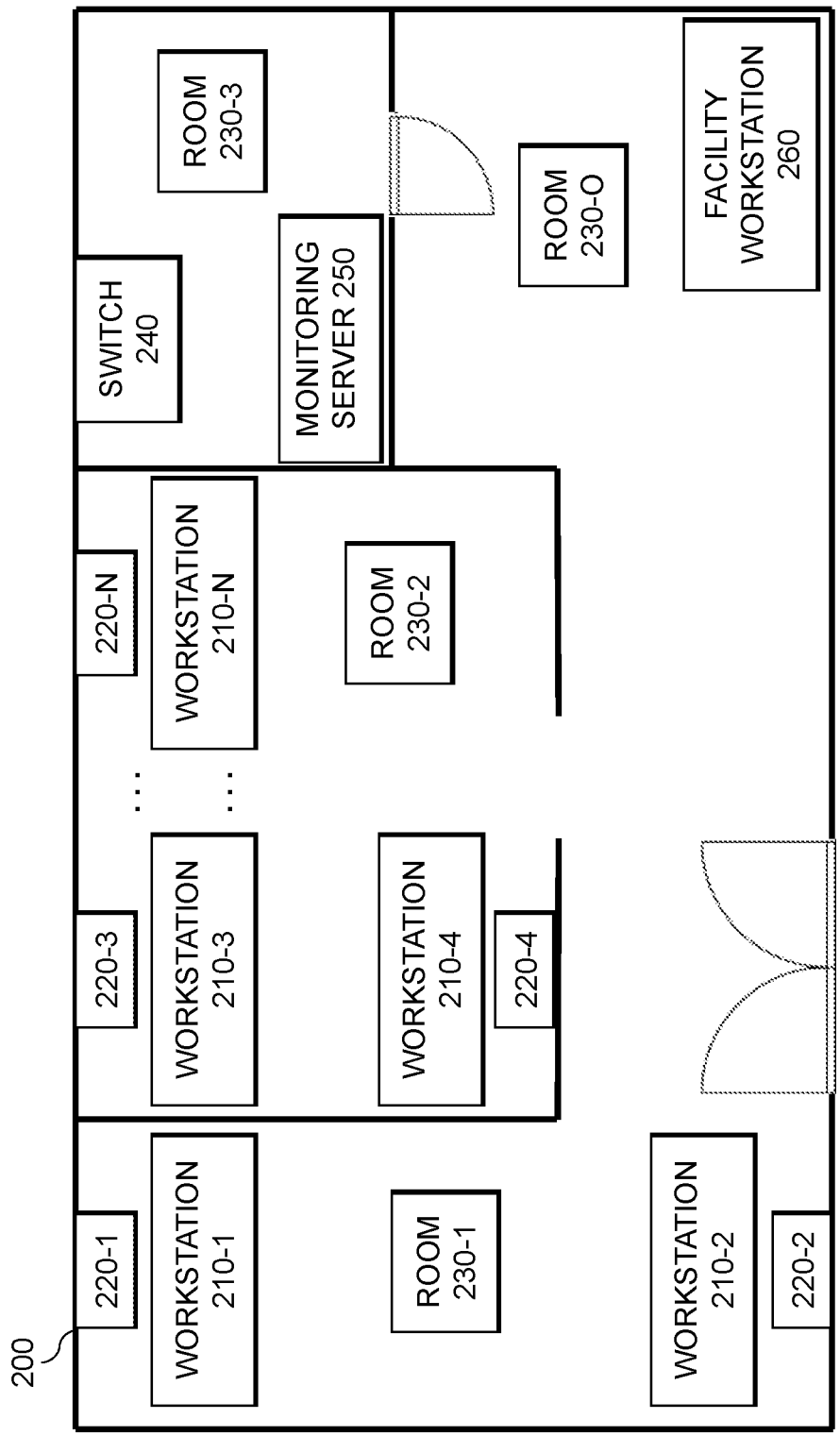
FIG. 2 illustrates an exemplary layout of a space in an exemplary office environment, according to one or more embodiments.

FIG. 2 illustrates an exemplary layout of a space 200 in an exemplary office environment, according to one or more embodiments. In the example of FIG. 2, the exemplary space 200 comprises a plurality of workstations 210-1 through 210-N, collectively referred to herein as workstations 210 in a plurality of rooms, such as rooms 230-1 through 230-0. Each workstation 210 is connected to a switch 240 of a network, such as network 104, using corresponding network ports 220-1 through 220-N. It is noted, however, that a given workstation 210 may comprise multiple network ports 220 in some embodiments.

In addition, in the example of FIG. 2, the exemplary space 200 comprises a monitoring server 250 which may be embodied as the physical location monitoring server 105 of FIG. 1. The monitoring server 250 automatically determines a location of a user in the space 200, for example, when the user attempts to work at a particular workstation 210 by connecting a laptop to the particular network port 220 associated with the particular workstation 210, as discussed further below in conjunction with FIG. 6. The monitoring server 250 automatically evaluates the determined location of the user in the space 200 relative to one or more physical location constraints to identify potential violations of the physical location constraints. If a violation of a particular physical location constraint is detected, the monitoring server 250 can provide an alert, for example, to an appropriate monitoring person working at a facility workstation 260.

FIG. 3 illustrates an exemplary workstation assignment table 300, according to some embodiments. In the example of FIG. 3, the exemplary workstation assignment table 300 assigns users (e.g., employees) to work at particular locations (e.g., at specific workstations 210 and/or in specified rooms 230), for example, according to a schedule. In some embodiments, particular physical locations (e.g., specific workstations 210) may be designated as being empty or unused for some time intervals (e.g., to facilitate social distancing).

In some organizations, an employee may be assigned a pre-allocated place where the employee is allowed to sit for a specified time period. In other variations, the room identifier in the workstation assignment table 300 may be specified using a grid identifier, or another mechanism for specifying a particular location within a particular environment.

Consider a particular employee, such as employee C, that was not scheduled to be in a particular location at a particular time, arrives at the location and selects workstation 210-2, which according to the schedule of FIG. 3 is supposed to be empty to enable social distancing. The monitoring server 250 will detect the violation of the physical location constraint, and may, for example, send an alert and prevent employee C from accessing the network 104.

Consider another employee that sits in the wrong location relative to the assignments shown in the workstation assignment table 300 of FIG. 3. For example, assume that employee B arrives to the site and selects workstation 210-1 instead of workstation 210-3. The monitoring server 250 will detect the violation of the physical location constraint indicating that employee B is working in the wrong location. The monitoring server 250 may, for example, send an alert and may prevent employee B from accessing the network 104 from workstation 210-1 (e.g., depending on the configuration of the remedial actions).

FIG. 4 illustrates an exemplary port mapping table 400, according to at least one embodiment. In the example of FIG. 4, the exemplary port mapping table 400 provides a mapping of network ports 220, using physical port identifiers, to particular workstations 210. In some embodiments, the port mapping table 400 provides a current mapping when a given network port 220 is connected to a device. In other embodiments, the port mapping table 400 may map physical ports to other location identifiers, such as rooms 230, grid coordinates, or another location identifier within a space, as would be apparent to a person of ordinary skill in the art.

Figure 5:
FIG. 5 is a sample table illustrating exemplary location constraint policies in accordance with some embodiments.

FIG. 5 is a sample table 500 illustrating exemplary location constraint policies in accordance with some embodiments. As noted above, one or more embodiments of the present disclosure are illustrated in the context of social distancing requirements in an office setting. The disclosed techniques for detecting violations of user physical location constraints, however, can be employed to enforce other physical location constraints in other environments, as would be apparent to a person of ordinary skill in the art.

In the example of FIG. 5, the exemplary location constraint policies in table 500 comprise a policy specifying the only one workstation 210 in rooms 230-1 and 230-2 (or other locations) may be occupied for a given time slot, for example, to maintain social distancing. In addition, other policies can specify that only employees of the same department (or with the same security clearance) may work in a specified room (or other location) per time slot, for example, to prevent information leakage.

In some embodiments, another physical location constraint can specify that the employees working in room 230-2 (or other location) must satisfy a stated diversity goal (for example, from a human resources guideline to encourage employees from multiple departments to collaborate) for a given time slot, for example, to promote diversity within an organization. A maximum number of persons for specified rooms 230 (or other locations) can be stated as a capacity limit, for example, to enforce a fire code. In yet another variation, a physical location constraint can specify that certain employees must not work in the same room 230 (or other location), for example, to enforce a protective order from a court. The physical location constraints can also be employed to specify that the students working in a particular room or other location must have a minimum spacing for a given time slot, for example, to prevent unauthorized collaboration (e.g., cheating).

Figure 6:
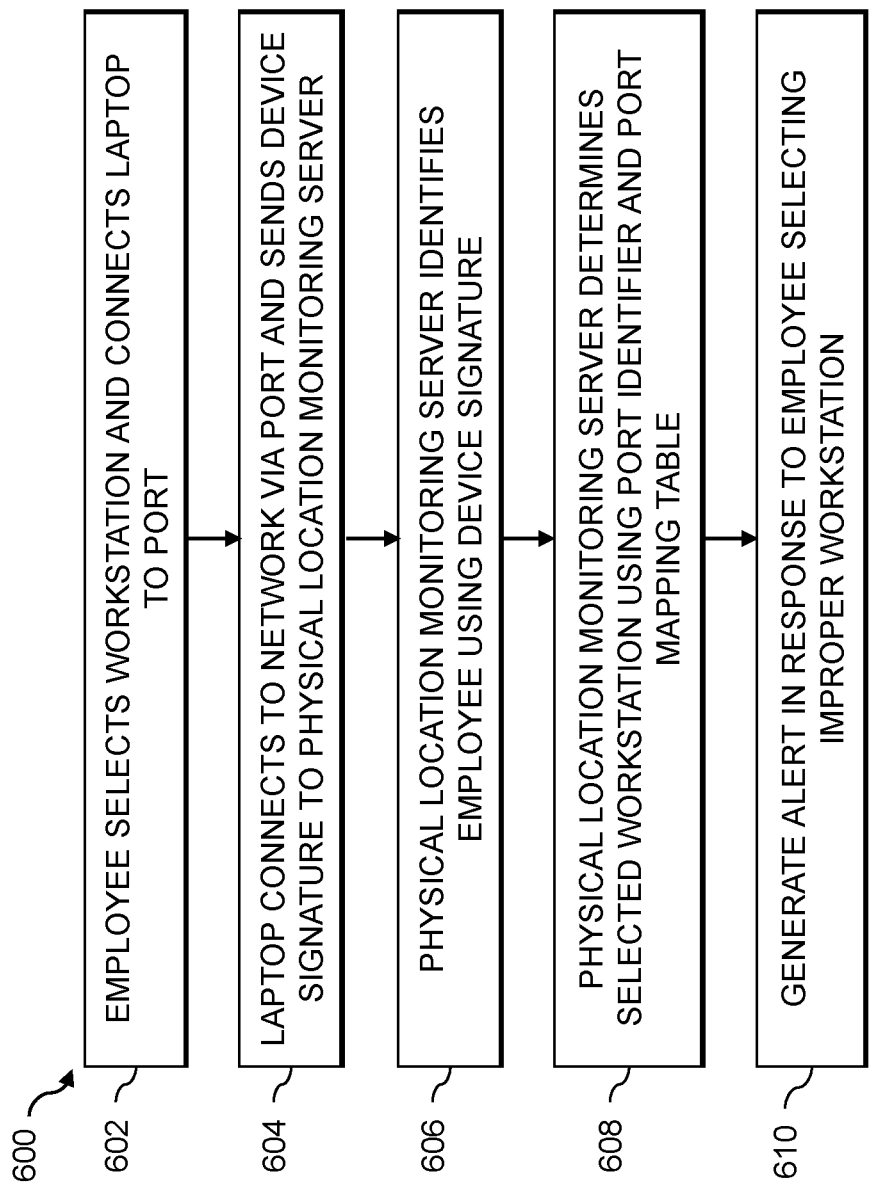
FIGS. 6 and 7 are flow charts illustrating exemplary implementations of processes for detecting violations of user physical location constraints, according to one embodiment of the disclosure.

FIG. 6 is a flow chart illustrating an exemplary implementation of a process 600 for detecting violations of user physical location constraints, according to one embodiment of the disclosure. In the example of FIG. 6, an employee selects a workstation 210 in step 602 and connects his or her laptop to a network port 220 associated with the selected workstation 210.

In step 604, the laptop of the employee connects to the network 104 via the network port 220 and the laptop sends a device signature of the laptop to the physical location monitoring server 250. In some embodiments, the device signature is based on one or more identifiers associated with software, hardware and/or network elements of the laptop.

For software elements, a hash function can be applied to (i) a code representation (e.g., text) of at least portions of each software element and/or (ii) at least portions of an identifier of each software element in (or otherwise associated with) a particular device. The software identifiers may comprise, for example, software serial numbers and/or software product name and version information.

For hardware elements, a hash function can be applied to a serial number or another identifier of the device (e.g., indicated on a service tag attached to the device) and/or of one or more hardware elements in (or otherwise associated with) a particular device. The hardware element identifiers of one or more hardware components within (or associated with) a particular device may comprise, for example, central processing unit (CPU) serial numbers, disk serial numbers, network card serial numbers, a BIOS serial number, a graphics processing unit (GPU) serial number, a RAM part number, and a monitor serial number.

The network address elements of the particular device may comprise, for example, a virtual private network (VPN) identifier (or an RSA identifier), a media access control address (MAC address) of one or more hardware elements of the particular device, a domain name server (DNS) address, a Dynamic Host Configuration Protocol (DHCP) address and/or a static IP address.

In one or more embodiments, the hash values for each hardware, software and/or network element may be summed and optionally combined with one or more salt values to add complexity to the device signature. In the case of a hardware element being a sub-system comprising multiple components (e.g., provided by a third party), the hash value may be associated with the sub-system, for example, and not each of the individual components within the sub-system.

In step 606 of the process 600, the physical location monitoring server 250 identifies the employee using the device signature collected in step 604. In further variations, the user can be identified by evaluating the username or other credentials submitted by the laptop to obtain access to the network 104. In step 608, the physical location monitoring server 250 uses the port identifier from step 604 and identifies the corresponding workstation 210 selected by the employee using the port mapping table 400. The physical location monitoring server 250 can compare the determined physical location of the employee, for example, to the workstation 210 assigned to the employee in the workstation assignment table 300 (or by evaluating other physical location constraints).

The process 600 generates an alert in step 610 (such as sending an email to a facilities monitor, or generating an alert in another system) in response to the employee selecting an improper workstation, for example, based on the workstation 210 assigned to the employee in the workstation assignment table 300.

In step 610, the process 600 may also, or alternatively, perform one or more other remedial and/or mitigation actions to address the detected violation of a physical location constraint, such as denying the network connection of the laptop; deactivating the laptop; otherwise blocking access of the employee to the network 104; restricting access of one or more accounts and/or one or more user devices 102 or services associated with the employee from accessing the network 104; initiating a step-up authentication of the employee with one or more additional authentication factors; preventing operation of one or more other devices in the same physical space as the employee; and/or preventing a display of information on one or more other devices in the same physical space as the employee.

Figure 7:
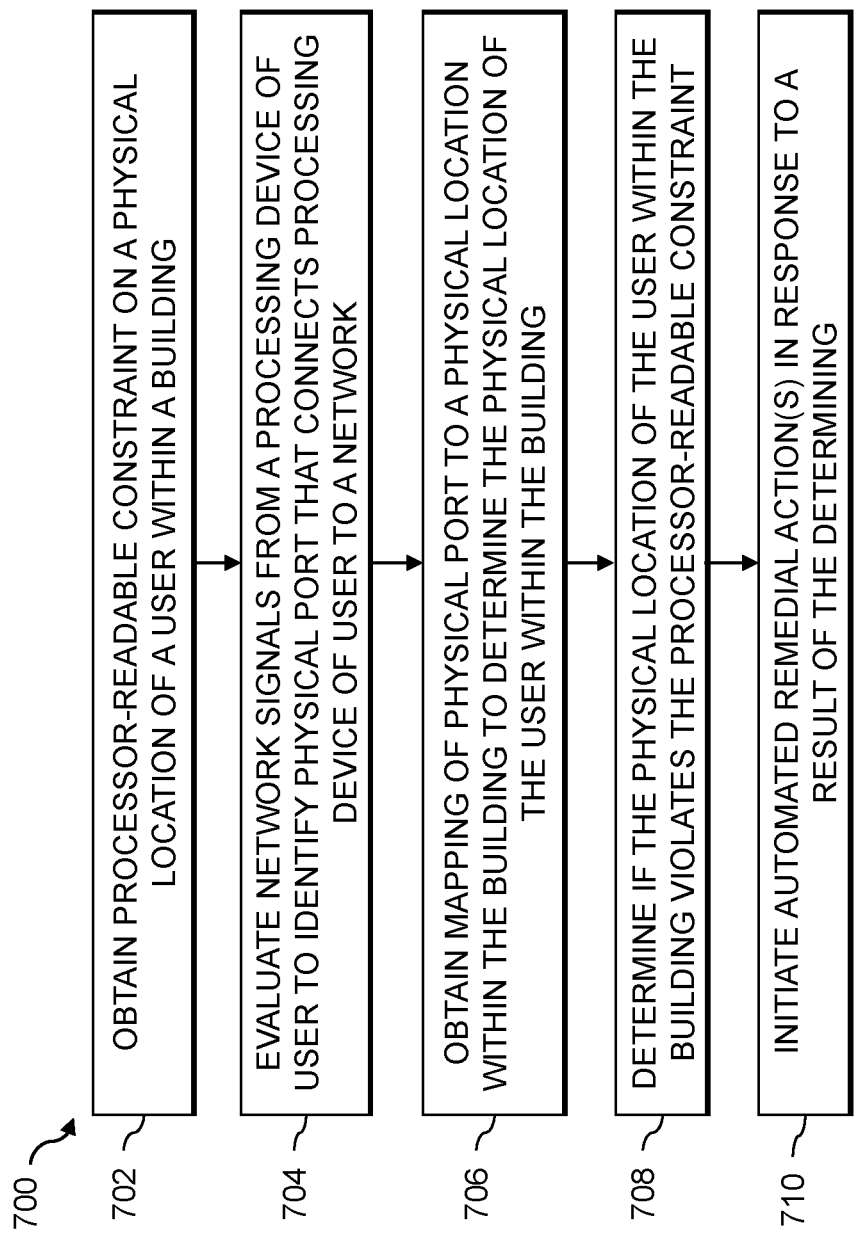

FIG. 7 is a flow chart an illustrating exemplary implementation of a process 700 for detecting violations of user physical location constraints, according to some embodiments of the disclosure. In step 702, the process 700 obtains a processor-readable constraint on a physical location of a user within a building. The term "building" as used herein is intended to be broadly construed, and shall encompass, for example, commercial buildings, residential buildings, academic buildings, other structures and multiple buildings in a facility or campus, and should not be viewed as being limited to any particular structures.

In step 704, a network signal from a processing device of the user is evaluated to identify a physical port that connects the processing device of the user to a network. A mapping of the physical port to a physical location within the building is obtained in step 706 to determine the physical location of the user within the building. In step 708, the process 700 determines if the physical location of the user within the building violates the processor-readable constraint. One or more automated remedial action(s) are initiated in step 710 in response to a result of the determining (for example, as discussed above in conjunction with FIG. 6).

In some embodiments, the at least one user is identified using a device signature of the processing device of the at least one user. For example, the device signature can be generated using one or more identifiers of at least one hardware element, at least one software element and/or at least one network element associated with the processing device of the at least one user, as discussed above. In one or more embodiments, the at least one processor-readable constraint on the physical location of the at least one user comprises a constraint to maintain a specified separation of the at least one user from at least one other user.

The particular processing operations and other network functionality described in conjunction with the flow diagrams of FIGS. 6 and 7, for example, are presented by way of illustrative example only, and should not be construed as limiting the scope of the disclosure in any way. Alternative embodiments can use other types of processing operations to enforce constraints on the physical location of users. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

The disclosed techniques for detecting violations of user physical location constraints can be employed, for example, to maintain social distancing or other physical location constraints among employees. In this manner, the disclosed physical location monitoring techniques can automatically determine a physical location of a user and determine if the current physical location of the user violates any physical location constraints.

One or more embodiments of the disclosure provide improved methods, apparatus and computer program products for detecting violations of user physical location constraints. The foregoing applications and associated embodiments should be considered as illustrative only, and numerous other embodiments can be configured using the techniques disclosed herein, in a wide variety of different applications.

It should also be understood that the disclosed physical location monitoring techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for detecting violations of user physical location constraints may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based physical location monitoring engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based physical location monitoring platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. These platforms may also be used to implement at least portions of other information processing systems in other embodiments.

Figure 8:
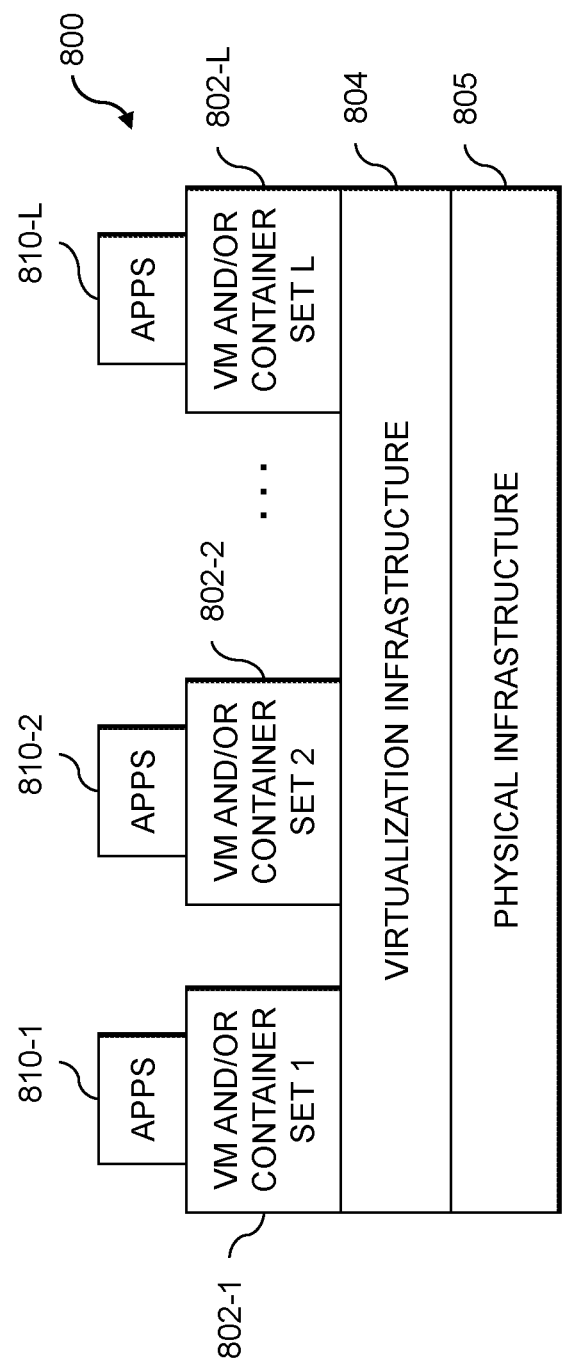
FIG. 8 illustrates an exemplary processing platform that may be used to implement at least a portion of one or more embodiments of the disclosure comprising a cloud infrastructure.

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. Such implementations can provide physical location monitoring functionality of the type described above for one or more processes running on a given one of the VMs. For example, each of the VMs can implement physical location monitoring control logic and associated remediation functionality for one or more processes running on that particular VM.

An example of a hypervisor platform that may be used to implement a hypervisor within the virtualization infrastructure 804 is the VMware® vSphere® which may have an associated virtual infrastructure management system such as the VMware® vCenter™. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system. Such implementations can provide physical location monitoring functionality of the type described above for one or more processes running on different ones of the containers. For example, a container host device supporting multiple containers of one or more container sets can implement one or more instances of physical location monitoring control logic and associated remediation functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a WAN, a LAN, a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an ASIC, an FPGA or other type of processing circuitry, as well as portions or combinations of such circuitry elements, and the memory 912, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Figure 9:
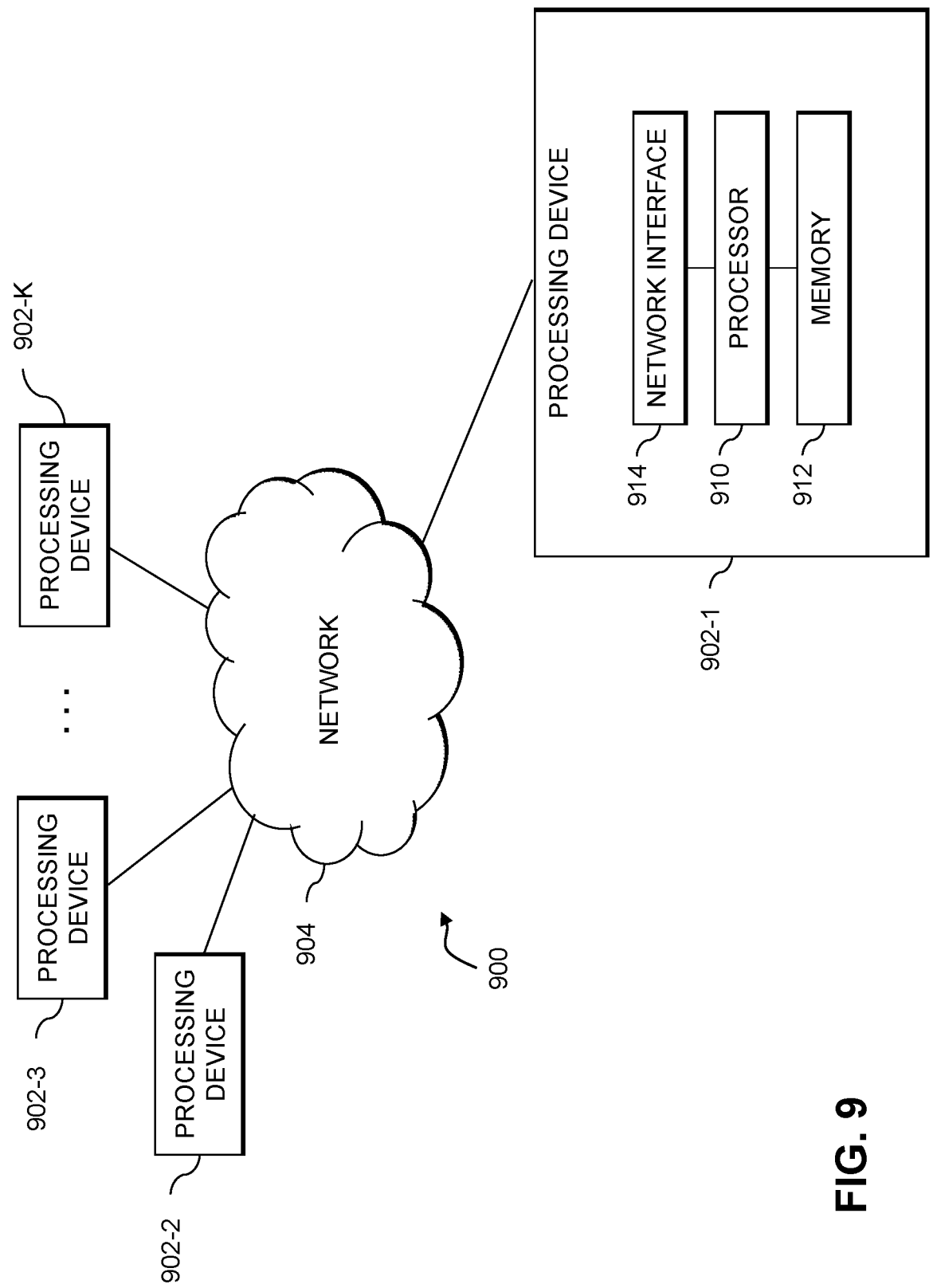
FIG. 9 illustrates another exemplary processing platform that may be used to implement at least a portion of one or more embodiments of the disclosure.

Multiple elements of an information processing system may be collectively implemented on a common processing platform of the type shown in FIG. 8 or 9, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell Technologies.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining at least one processor-readable user-specific constraint on a physical location of at least one user within a building, wherein the at least one processor-readable user-specific constraint specifies one or more restrictions on the physical location of the at least one user, within the building, relative to a physical location within the building of at least one other person;
evaluating one or more network signals from a processing device of the at least one user to identify a physical port that connects the processing device of the at least one user to a network at least partially within the building;
obtaining a mapping of the physical port to a physical location within the building to determine the physical location of the at least one user within the building;
determining if the physical location of the at least one user within the building violates the at least one processor-readable user-specific constraint; and
initiating one or more automated actions in response to a result of the determining;
wherein the method is performed by at least one processing device comprising a processor coupled to a memory.

2. The method of claim 1, further comprising identifying the at least one user using a device signature of the processing device of the at least one user.

3. The method of claim 2, wherein the device signature is generated using one or more identifiers of one or more of at least one hardware element, at least one software element and at least one network element associated with the processing device of the at least one user.

4. The method of claim 1, wherein the at least one processor-readable user-specific constraint on the physical location of the at least one user comprises a constraint implemented to one or more of: maintain social distancing, prevent information leakage, promote diversity, enforce a capacity limit, enforce a protective order, and prevent unauthorized collaboration.

5. The method of claim 1, wherein the at least one processor-readable user-specific constraint on the physical location of the at least one user comprises a constraint to maintain a specified separation of the at least one user from at least one other user.

6. The method of claim 1, wherein the determining if the physical location of the at least one user within the building violates the at least one processor-readable user-specific constraint comprises evaluating an assignment of the at least one user to a particular portion of the building.

7. The method of claim 1, wherein the one or more automated actions comprise one or more of: generating an alert, denying a network connection of the processing device of the at least one user; and deactivating at least a portion of the processing device of the at least one user.

8. An apparatus comprising:
at least one processing device comprising a processor coupled to a memory;
the at least one processing device being configured to implement the following steps:
obtaining at least one processor-readable user-specific constraint on a physical location of at least one user within a building, wherein the at least one processor-readable user-specific constraint specifies one or more restrictions on the physical location of the at least one user, within the building, relative to a physical location within the building of at least one other person;
evaluating one or more network signals from a processing device of the at least one user to identify a physical port that connects the processing device of the at least one user to a network at least partially within the building;
obtaining a mapping of the physical port to a physical location within the building to determine the physical location of the at least one user within the building;
determining if the physical location of the at least one user within the building violates the at least one processor-readable user-specific constraint; and
initiating one or more automated actions in response to a result of the determining;
determining if the physical location of the at least one user within the building violates the at least one processor-readable user-specific constraint; and
initiating one or more automated actions in response to a result of the determining.

9. The apparatus of claim 8, further comprising identifying the at least one user using a device signature of the processing device of the at least one user.

10. The apparatus of claim 9, wherein the device signature is generated using one or more identifiers of one or more of at least one hardware element, at least one software element and at least one network element associated with the processing device of the at least one user.

11. The apparatus of claim 8, wherein the at least one processor-readable user-specific constraint on the physical location of the at least one user comprises a constraint implemented to one or more of: maintain social distancing, prevent information leakage, promote diversity, enforce a capacity limit, enforce a protective order, and prevent unauthorized collaboration.

12. The apparatus of claim 8, wherein the at least one processor-readable user-specific constraint on the physical location of the at least one user comprises a constraint to maintain a specified separation of the at least one user from at least one other user.

13. The apparatus of claim 8, wherein the determining if the physical location of the at least one user within the building violates the at least one processor-readable user-specific constraint comprises evaluating an assignment of the at least one user to a particular portion of the building.

14. The apparatus of claim 8, wherein the one or more automated actions comprise one or more of: generating an alert, denying a network connection of the processing device of the at least one user; and deactivating at least a portion of the processing device of the at least one user.

15. A non-transitory processor-readable storage medium having stored therein program code of one or more software programs, wherein the program code when executed by at least one processing device causes the at least one processing device to perform the following steps:
obtaining at least one processor-readable user-specific constraint on a physical location of at least one user within a building, wherein the at least one processor-readable user-specific constraint specifies one or more restrictions on the physical location of the at least one user, within the building, relative to a physical location within the building of at least one other person;
evaluating one or more network signals from a processing device of the at least one user to identify a physical port that connects the processing device of the at least one user to a network at least partially within the building;

obtaining a mapping of the physical port to a physical location within the building to determine the physical location of the at least one user within the building;

determining if the physical location of the at least one user within the building violates the at least one processor-readable user-specific constraint; and initiating one or more automated actions in response to a result of the determining.

16. The non-transitory processor-readable storage medium of claim 15, further comprising identifying the at least one user using a device signature of the processing device of the at least one user.

17. The non-transitory processor-readable storage medium of claim 16, wherein the device signature is generated using one or more identifiers of one or more of at least one hardware element, at least one software element and at least one network element associated with the processing device of the at least one user.

18. The non-transitory processor-readable storage medium of claim 15, wherein the at least one processor-readable user-specific constraint on the physical location of the at least one user comprises a constraint implemented to one or more of: maintain social distancing, prevent information leakage, promote diversity, enforce a capacity limit, enforce a protective order, and prevent unauthorized collaboration.

19. The non-transitory processor-readable storage medium of claim 15, wherein the determining if the physical location of the at least one user within the building violates the at least one processor-readable user-specific constraint comprises evaluating an assignment of the at least one user to a particular portion of the building.

20. The non-transitory processor-readable storage medium of claim 15, wherein the one or more automated actions comprise one or more of: generating an alert, denying a network connection of the processing device of the at least one user; and deactivating at least a portion of the processing device of the at least one user.

* * * * *